(12) United States Patent
Kojima et al.

(10) Patent No.: US 7,983,376 B2
(45) Date of Patent: Jul. 19, 2011

(54) BOILING WATER NUCLEAR REACTOR AND EMERGENCY CORE COOLING SYSTEM OF THE SAME

(75) Inventors: Yoshihiro Kojima, Kanagawa (JP); Takashi Sato, Kanagawa (JP); Hirohide Oikawa, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/828,798

(22) Filed: Jul. 1, 2010

(65) Prior Publication Data

US 2010/0272226 A1    Oct. 28, 2010

Related U.S. Application Data

(62) Division of application No. 12/056,813, filed on Mar. 27, 2008, now abandoned.

(30) Foreign Application Priority Data

Mar. 29, 2007   (JP) ................. 2007-087617

(51) Int. Cl.
*G21C 9/00*     (2006.01)
(52) U.S. Cl. ......... 376/282; 376/283; 376/293; 376/298
(58) Field of Classification Search .................. 376/282, 376/283, 293, 298
See application file for complete search history.

(56) References Cited

U.S. PATENT DOCUMENTS

| | | | |
|---|---|---|---|
| 5,106,571 A | 4/1992 | Wade et al. | |
| 5,295,168 A | 3/1994 | Gluntz et al. | |
| 5,353,318 A | 10/1994 | Gluntz | |
| 5,703,917 A | 12/1997 | Hau et al. | |
| 6,243,432 B1 | 6/2001 | Cheung et al. | |
| 6,810,099 B2 | 10/2004 | Nakamaru et al. | |
| 6,895,068 B2 | 5/2005 | Hartel et al. | |
| 2002/0101951 A1 | 8/2002 | Nakamaru et al. | |
| 2007/0092053 A1 | 4/2007 | Sato | |

FOREIGN PATENT DOCUMENTS

| | | |
|---|---|---|
| JP | 59-193395 A | 11/1984 |
| JP | 02-115793 A | 4/1990 |
| JP | 05-232281 A | 9/1993 |
| JP | 06-130173 A | 5/1994 |
| JP | 06-324177 A | 11/1994 |

(Continued)

OTHER PUBLICATIONS

Y. Kojima et al., U.S. PTO Office Action, U.S. Appl. No. 12/056,813, dated Sep. 4, 2009.

(Continued)

*Primary Examiner* — Rick Palabrica
(74) *Attorney, Agent, or Firm* — Foley & Lardner LLP (57) ABSTRACT

A boiling water nuclear reactor comprises: a reactor containment vessel including a dry well and a wet well; a vent pipe connecting the dry well and the pressure suppression pool; a gravity-driven water injection pool to hold boric acid aqueous solution; an emergency core water-injection piping system for causing the boric acid aqueous solution in the gravity-driven water injection pool to fall so as to be injected into the reactor pressure vessel in case of reactor accident; a static containment vessel cooling system pool; a static containment vessel cooling system heat exchanger; a dry well connection pipe connecting an upper part of the static containment vessel cooling system heat exchanger and the dry well; and a gas vent pipe for discharging noncondensible gas in the static containment vessel cooling system heat exchanger into the inside of the pressure suppression pool.

14 Claims, 4 Drawing Sheets

FOREIGN PATENT DOCUMENTS

| | | |
|---|---|---|
| JP | 07-134193 A | 5/1995 |
| JP | 08-005772 A | 1/1996 |
| JP | 08-511103 A | 11/1996 |
| JP | 2918353 B2 | 4/1999 |
| JP | 2002-168986 A | 6/2002 |
| JP | 2006-138680 A | 6/2006 |
| JP | 2007-010457 A | 1/2007 |

OTHER PUBLICATIONS

Y. Kojima et al., U.S. PTO Final Office Action, U.S. Appl. No. 12/056,813, dated Apr. 15, 2010.

REACTOR CONTAINMENT VESSEL PRESSURE

TIME →

BOILING WATER NUCLEAR REACTOR AND EMERGENCY CORE COOLING SYSTEM OF THE SAME

CROSS REFERENCES TO RELATED APPLICATIONS

The present application is a Divisional of U.S. application Ser. No. 12/056,813, filed Mar. 27, 2008 which is based upon and claims benefit of priority from prior Japanese Patent Application No. 2007-87617, filed in the Japanese Patent Office on Mar. 29, 2007, the entire content of which is incorporated herein by reference.

BACKGROUND OF THE INVENTION

This invention relates to a gravity-driven emergency core cooling system (ECCS) and also to a boiling water nuclear reactor (BWR) using the same.

Studies are being made of introducing equipment that operates statically (passively), utilizing natural force, without using dynamic (actively) devices such as pumps mainly in order to raise the simplicity of safety equipment and improve the reliability of boiling water nuclear reactors. Among others, gravity-driven emergency core cooling systems (ECCS) are known for pouring water into the nuclear reactor in case of an accident as shown in Japanese Patent Application Laid-Open Publication No. 02-115793 and Japanese Patent No. 2918353 the entire contents of which are incorporated herein by reference.

An ordinary boiling water nuclear reactor has a reactor containment vessel, which includes a dry well and a wet well. The dry well contains a rector pressure vessel. A pressure suppression pool is housed in the wet well and the water in the pool is to be used to fill the fuel exchange pool with water when suspending the operation of the reactor and replacing the core fuel.

When a loss-of-coolant accident (LOCA) occurs and the pipe connected to the reactor pressure vessel is ruptured in the inside of the dry well, the water level in the reactor pressure vessel falls. Then, as the signal indicating the water level in the reactor pressure vessel or the pressure level of the dry well is detected, the isolation valve arranged at the gravity-driven water injection pipe connected to a gravity-driven water injection pool is opened to inject cooling water into the reactor pressure vessel by means of the gravity-driven ECCS.

The injected cooling water gradually raises the water level in the reactor pressure vessel. As the water level reaches the ruptured part of the pipe, water spills and falls into the dry well to submerge a lower part of the dry well which is referred to as a "dry well lower region" in water. Therefore, a gravity-driven water injection pool is required to contain a large volume of water of about 1,500 m$^3$.

The gravity-driven water injection pool is held in communication with the dry well and its performance of injecting water into the reactor pressure vessel is determined by the water head of gravity-driven water injection pool. Therefore, the pressure difference between the inside of the reactor pressure vessel and that of the dry well needs to be minimized by opening the pressure-reducing valve before opening the isolation valve arranged at gravity-driven water injection pipe. While the steam generated continuously by the decay heat coming from the core is discharged partly into the dry well by way of the pressure-reducing valve, it is introduced to and condensed by the heat exchanger of the static containment vessel cooling system so that the internal pressure of the reactor containment vessel will not be raised excessively. In this way, when a LOCA occurs, the core and the reactor containment vessel are effectively cooled and held safe and sound.

On the other hand, when the isolation valve and/or the pressure-reducing valve of the gravity-driven water injection pipe become unopenable for some reason or another, there arises a situation where the core can no longer be cooled. Then, the core can become damaged and molten. If such is the case, the molten core melts the reactor pressure vessel and runs through the latter to fall into and settle in the dry well lower region.

If the molten core is not cooled and held to a hot condition, it reacts with the bottom concrete of the dry well lower region to produce noncondensible gas, which can raise the internal pressure of the reactor containment vessel. To cope with such a situation, a piping arrangement may be adapted such that by detecting the temperature rise of the dry well lower region, the injection pipe of the gravity-driven water injection pool extending to the lower part of the dry well is opened to inject cooling water onto and cool an upper part of the molten core.

Besides a LOCA, an anticipated transient without scram (ATWS) can take place to threaten the safety of nuclear reactor. This is an incident where the attempt to insert the control rods fails partly or totally although a scram is required for the nuclear reactor in order to protect the core and the reactor containment vessel when an accident of total loss of water feed to the nuclear reactor or an incident of a total closure of the main steam isolation valve occurs.

In an ATWS where the trouble proceeds with high internal pressure of the reactor, accompanying isolation of the reactor, a large quantity of reactor coolant is discharged in the form of steam from the main steam safety relief valve into the wet well to raise the internal pressure of the reactor containment vessel. Therefore, it is essential to maintain the soundness of the core and the reactor containment vessel by appropriately maintaining the water level in the reactor and forcing the reactor to quickly move into a subcritical state by injecting boric acid aqueous solution from the boric acid aqueous solution injection tank. The boric acid aqueous solution injection tank contains only about 20 m$^3$ of boric acid aqueous solution that can put the core back into a subcritical state when mixed with the cooling water in the reactor pressure vessel and hence is very small if compared with the gravity-driven water injection pool.

Assume a situation where an ATWS incident takes place and the pressure-reducing valve is opened so that water is injected by the gravity-driven ECCS. In such a situation, there arises a possibility that the injection of boric acid aqueous solution has been completed before the injection of water by means of the gravity-driven ECCS is started to make it difficult to maintain the subcritical state so that the core may be plunged back into a critical state because the boric acid is diluted by about 1,500 m$^3$ cold water injected by the gravity-driven ECCS. On the other hand, the safety of the reactor can be made more reliable when the boric acid concentration is held to a certain high level in such a situation.

In view of the above-identified circumstances, it is therefore the object of the present invention to make it possible to secure the safety of a reactor by reliably maintaining a subcritical state even when the gravity-driven ECCS is actuated when an ATWS takes place in a boiling water nuclear reactor.

BRIEF SUMMARY OF THE INVENTION

In order to attain the object, according to an aspect of the present invention, there is provided a boiling water nuclear reactor comprising: a core; a reactor pressure vessel containing the core; a reactor containment vessel including: a dry well containing the reactor pressure vessel, and a wet well containing a pressure suppression pool; a vent pipe connecting the dry well and the pressure suppression pool; a gravity-driven water injection pool arranged at a position higher than the core to hold boric acid aqueous solution therein; an emergency core water-injection piping system for causing the boric acid aqueous solution in the gravity-driven water injection pool to fall by gravity so as to be injected into the reactor pressure vessel in case of reactor accident; a static containment vessel cooling system pool arranged outside the reactor containment vessel; a static containment vessel cooling system heat exchanger arranged in the static containment vessel cooling system pool; a dry well connection pipe connecting an upper part of the static containment vessel cooling system heat exchanger and the dry well; and a gas vent pipe for discharging noncondensible gas in the static containment vessel cooling system heat exchanger into the inside of the pressure suppression pool.

According to another aspect of the present invention, there is provided an emergency core cooling system of a boiling water nuclear reactor, the emergency core cooling system comprising: a gravity-driven water injection pool to hold boric acid aqueous solution therein, the gravity-driven water injection pool being arranged at a position higher than the core; an emergency core water-injection piping system for causing the boric acid aqueous solution in the gravity-driven water injection pool to fall by gravity so as to be injected into a reactor pressure vessel containing the core, in case of reactor accident; a static containment vessel cooling system pool arranged outside the reactor containment vessel at a position above a pressure suppression pool; a static containment vessel cooling system heat exchanger arranged in the static containment vessel cooling system pool; a dry well connection pipe connecting an upper part of the static containment vessel cooling system heat exchanger and the dry well; and a gas vent pipe for discharging noncondensible gas in the static containment vessel cooling system heat exchanger into inside of the pressure suppression pool.

BRIEF DESCRIPTION OF THE DRAWINGS

The above and other features and advantages of the present invention will become apparent from the discussion hereinbelow of specific, illustrative embodiments thereof presented in conjunction with the accompanying drawings, in which.

DETAILED DESCRIPTION OF THE INVENTION

Now, the present invention will be described in greater detail by referring to the accompanying drawings that schematically illustrate preferred embodiments of the present invention. Throughout the drawings, the same or similar parts are denoted respectively by the same reference symbols and their description is omitted.

First Embodiment

Figure 1:
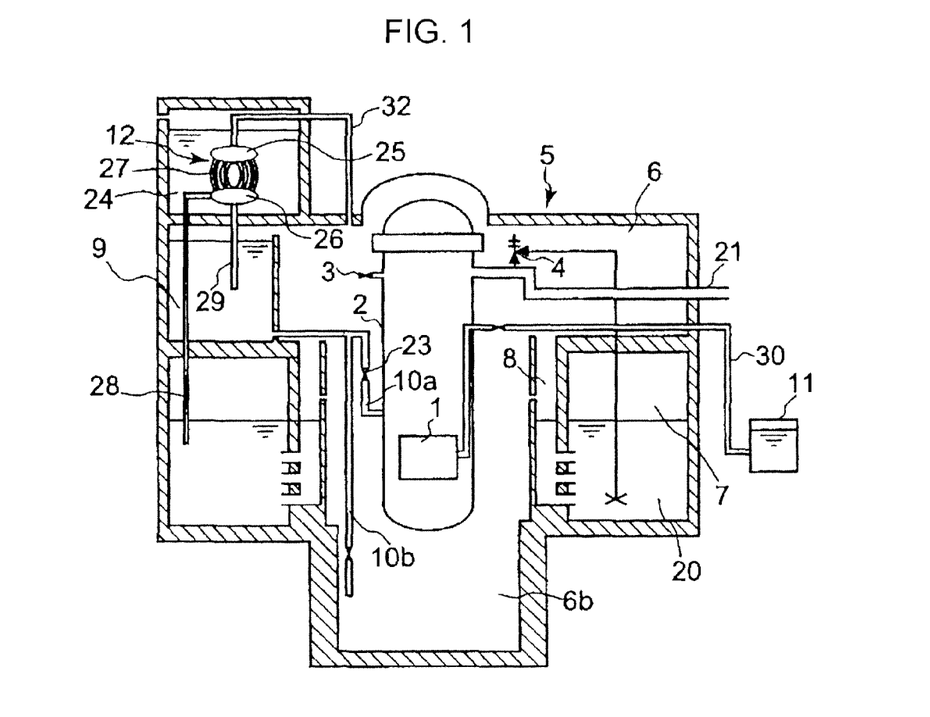
FIG. 1 is a schematic elevational cross-sectional view of the first embodiment of a boiling water nuclear reactor according to the present invention.

FIG. 1 is a schematic elevational cross-sectional view of the first embodiment of a boiling water nuclear reactor according to the present invention. The reactor containment vessel 5 of the reactor includes a dry well 6 and a wet well 7, and a reactor pressure vessel 2 of the reactor is contained in the dry well 6. A pressure suppression pool 20 is arranged in the wet well 7. The water in the pressure suppression pool 20 is used to fill the fuel exchange pool with water when the operation of the reactor stopped to replace the core fuel. The reactor pressure vessel 2 contains the core 1, the internal structure and the reactor water (not shown).

Vent pipes 8 extend from an upper part of the dry well 6 into the pressure suppression pool 20. Main steam pipes 21 are arranged to feed the main steam generated in the reactor pressure vessel 2 to the steam turbine (not shown) outside the reactor containment vessel 5 and main steam safety relief valves 4 are fitted to the main steam pipes 21 at positions in the dry well 6 so that steam may be introduced from the inside of the main steam pipes 21 into the pressure suppression pool 20 by way of the safety valves 4. A pressure-reducing valve 3 is connected to the reactor pressure vessel 2 at a position above the core 1.

A gravity-driven water injection pool 9 is arranged at a position higher than the core 1 in an upper part in the inside of the dry well 6 to constantly store boric acid aqueous solution therein. In the case of a large scale nuclear power plant, the gravity-driven water injection pool 9 constantly stores about 1,500 m$^3$ of boric acid aqueous solution therein. The boric acid aqueous solution in the gravity-driven water injection pool 9 can be injected into the reactor pressure vessel 2 by way of the isolation valve 23 and a gravity-driven water injection pipe 10a. Additionally, the boric acid aqueous solution in the gravity-driven water injection pool 9 can be injected into a dry well lower region 6b by gravity by way of an emergency dry well water-injection piping system 10b.

A static containment vessel cooling system pool 24 is arranged above the reactor containment vessel 5 and a static containment vessel cooling system heat exchanger 12 is immersed in the static containment vessel cooling system pool 24. The static containment vessel cooling system heat exchanger 12 includes an upper header 25, a lower header 26 and a plurality of heat transfer pipes 27 connecting the upper header 25 and the lower header 26.

The upper header 25 is held in communication with an upper part of the dry well 6 by way of a dry well connection pipe 32. A gas vent pipe 28 is connected to an upper part of the lower header 26 so that the noncondensible gas in the lower header 26 can be discharged into the inside of the pressure suppression pool 20. Additionally, a drain pipe 29 is connected to a bottom part of the lower header 26 so that the condensed water in the lower header 26 can be discharged into the gravity-driven water injection pool 9.

An accumulator type boric acid aqueous solution injection tank 11 is arranged outside the reactor containment vessel 5 so that boric acid aqueous solution can be injected into the core 1 by way of a boric acid aqueous solution injection pipe 30. In the case of a large scale nuclear power plant, the boric acid aqueous solution injection tank 11 typically stores about 20 m³ of boric acid aqueous solution, which is by far less than the quantity of boric acid aqueous solution stored in the gravity-driven water injection pool 9.

When an accident (LOCA) occurs and any of the pipes connected to the reactor pressure vessel 2 is ruptured in the inside of the dry well 6, a large volume of coolant flows out from the reactor pressure vessel 2 into the dry well 6 and the steam and the noncondensible gas flown into the dry well 6 then flow into the pressure suppression pool 20 in the wet well 7 by way of the vent pipe 8. The noncondensible gas may be the nitrogen that is contained in the dry well 6 in advance or the hydrogen that is produced when the core is damaged.

Thereafter, the flow rate of the coolant flowing out from the reactor pressure vessel 2 into the dry well 6 reduces and the flow of coolant stops when the pressure difference between the dry well 6 and the wet well 7 becomes sufficiently smaller than the pressure level that corresponds to the depth by which the vent pipes 8 are submerged in the water. Then, steam and noncondensible gas flow toward the static containment vessel cooling system heat exchanger 12 that shows a smaller pressure difference by way of the dry well connection pipe 32 and steam is condensed in the static containment vessel cooling system heat exchanger 12. The depth by which the gas vent pipe 28 is submerged in the water is made smaller than the depth by which the vent pipes 8 are submerged in the water in order to make the latter flow take place predominantly.

The steam that is continuously generated by the decay heat from the core 1 and flows into the dry well 6 is partly led to the static containment vessel cooling system heat exchanger 12 with noncondensible gas by way of the dry well connection pipe 32 and condensed there. Therefore, the internal pressure of the reactor containment vessel 5 is not raised excessively by the generated steam. The condensed water produced by the heat transfer pipes 27 of the static containment vessel cooling system heat exchanger 12 accumulates on the bottom of the lower header 26 and falls into the gravity-driven water injection pool 9 by way of the drain pipe 29. The noncondensible gas accumulated in an upper part of the lower header 26 is discharged into the pressure suppression pool 20 by way of the gas vent pipe 28.

On the other hand, the water level in the reactor pressure vessel 2 falls as coolant flows from the reactor pressure vessel 2 to the dry well 6. At this time, in order to prevent damage of the core 1, after detecting the signal indicating a low water level in the reactor pressure vessel 2 or a high pressure level in the dry well 6, the isolation valve 23 arranged at the gravity-driven water injection pipe 10a, which is connected to the gravity-driven water injection pool 9, is opened. Then, boric acid aqueous solution is injected from the inside of the gravity-driven water injection pool 9 into the reactor pressure vessel 2 by means of the gravity-driven ECCS. The injected boric acid aqueous solution gradually raises the water level in the inside of the reactor pressure vessel 2. As the water level reaches the ruptured position of the pipe, boric acid aqueous solution spills and flows into the dry well 6 to submerge the dry well lower region 6b in water.

The gravity-driven water injection pool 9 holds boric acid aqueous solution by an amount that is sufficient to completely submerge the dry well lower region 6b in water. The gravity-driven water injection pool 9 is held in communication with the dry well 6 and its performance of injecting water into the reactor pressure vessel 2 is determined by the water head of gravity-driven water injection pool 9. Therefore, the pressure difference between the inside of the reactor pressure vessel 2 and that of the dry well 6 needs to be minimized by opening the pressure-reducing valve 3 before opening the isolation valve 23 arranged at gravity-driven water injection pipe 10a. Additionally, the steam generated continuously by the decay heat coming from the core 1 is discharged partly into the dry well 6 by way of the pressure-reducing valve 3.

In this way, the core 1 and the reactor containment vessel 5 can be cooled and the soundness thereof can be maintained when a LOCA occurs.

On the other hand, when the isolation valve 23 and/or the pressure-reducing valve 3 of the gravity-driven water injection pipe 10a becomes unopenable for some reason or another, there may arise a situation where the core 1 can no longer be cooled. Then, the core 1 can become damaged and molten. If such is the case, the molten core melts the reactor pressure vessel 2 and moves through the latter to fall into and settle in the dry well lower region 6b. If the molten core is not cooled and held to a hot condition, it reacts with the bottom concrete of the dry well lower region 6b to produce noncondensible gas, which can raise the internal pressure of the reactor containment vessel 5. In such a situation, the embodiment detects the temperature rise of the dry well lower region 6b and opens the emergency dry well water-injection piping system 10b from the gravity-driven water injection pool 9 to inject boric acid aqueous solution into and cool the molten upper part of the core.

In an anticipated transient without scram (ATWS) where a high pressure situation of the reactor continues while the reactor is isolated, a large volume of reactor coolant is discharged into the wet well 7 through the main steam safety relief valve 4 in the form of steam to raise the pressure in the reactor containment vessel 5. Therefore, the reactor is quickly moved into a subcritical state by injecting boric acid aqueous solution from the boric acid aqueous solution injection tank 11 into the core 1 by way of the boric acid aqueous solution injection pipe 30, while maintaining the water level in the reactor to an appropriate level. However, the boric acid aqueous solution injection tank 11 contains only about 20 m³ of boric acid that can put the core 1 back into a subcritical state when mixed with the cooling water in the reactor pressure vessel 2 and hence is very small if compared with the gravity-driven water injection pool 9.

Assume now a situation where an ATWS takes place and the pressure-reducing valve 3 is opened so that water is injected by the gravity-driven ECCS. In such a situation, even if the injection of boric acid aqueous solution has been completed before the injection of water by means of the gravity-driven ECCS is started, the boric acid is not diluted by the gravity-driven ECCS because the boric acid aqueous solution is contained in the gravity-driven water injection pool 9. Thus, the subcritical state of the core can be maintained.

Furthermore, this embodiment can maintain the reactor in a subcritical state not only in an ATWS that accompanies isolation of the reactor but also in a situation where the attempt to insert the control rods fails partly or totally when a LOCA occurs. Thus, the reactor can be maintained in a subcritical state even if a gigantic earthquake of a magnitude that exceeds the design magnitude takes place, although such a situation can hardly arise in reality, and even if a LOCA occurs consequently to make it impossible to insert control rods because the fuel channels are bent.

Furthermore, in a situation where a LOCA occurs and the isolation valve 23 and/or the pressure-reducing valve 3 of the gravity-driven water injection pipe 10a becomes unopenable for some reason or another so that the core 1 is damaged and molten to damage the reactor pressure vessel 2 and the molten substances are accumulated in the dry well lower region 6b before the isolation valve of the emergency dry well water-injection piping system 10b is opened to cool the molten substances, the molten radioactive substances can be highly reliably prevented from falling back into a critical state by the injected boric acid aqueous solution.

Figure 2:
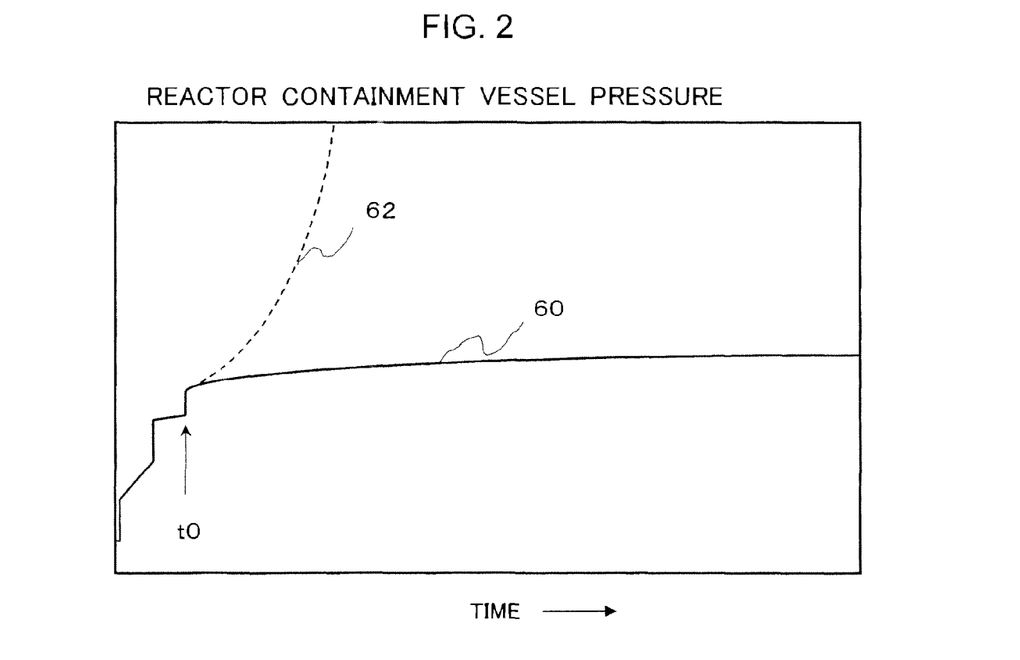
FIG. 2 is a graph illustrating in comparison the outcome of analysis of the pressure behavior of the reactor containment vessel of the first embodiment of the boiling water nuclear reactor according to the present invention when the core is damaged and the outcome of analysis of the pressure behavior of the reactor containment vessel of a conventional boiling water nuclear reactor.

FIG. 2 is a graph illustrating how the internal pressure of the reactor containment vessel 5 is expected to change when the molten substances accumulated in the dry well lower region 6b do not fall back into a critical state and when they fall back into a critical state. It is assumed for FIG. 2 that the reactor pressure vessel 2 is damaged and the molten substances of the core 1 are accumulated in the dry well lower region 6b and that the operation of injecting boric acid aqueous solution from the gravity-driven water injection pool 9 into the dry well lower region 6b by way of the emergency dry well water-injection piping system 10b at time "t0".

With this embodiment, boric acid aqueous solution is poured onto the molten substances from above to prevent them from falling back into a critical state so that the internal pressure of the reactor containment vessel 5 does not rise excessively and hence the reactor containment vessel 5 is not damaged as indicated by the solid line 60 in FIG. 2. The net results will be that no radioactive substances are discharged into the surrounding environment on a large scale.

If, on the other hand, the gravity-driven water injection pool 9 simply holds water according to the conventional art, the molten substances accumulated in the dry well lower region 6b can fall back into a critical state. Then, steam would be generated to an extent that exceeds the level corresponding to decay heat and would be far above the steam condensing capacity of the static containment vessel cooling system heat exchanger 12, so that the internal pressure of the reactor containment vessel 5 might rise as indicated by the dotted line 62 in FIG. 2 to consequently damage the reactor containment vessel 5.

The boric acid aqueous solution injection system including the boric acid aqueous solution injection tank 11 and the boric acid aqueous solution injection pipe 30 shown in FIG. 1 may be omitted from the above-described embodiment.

Second Embodiment

Figure 3:
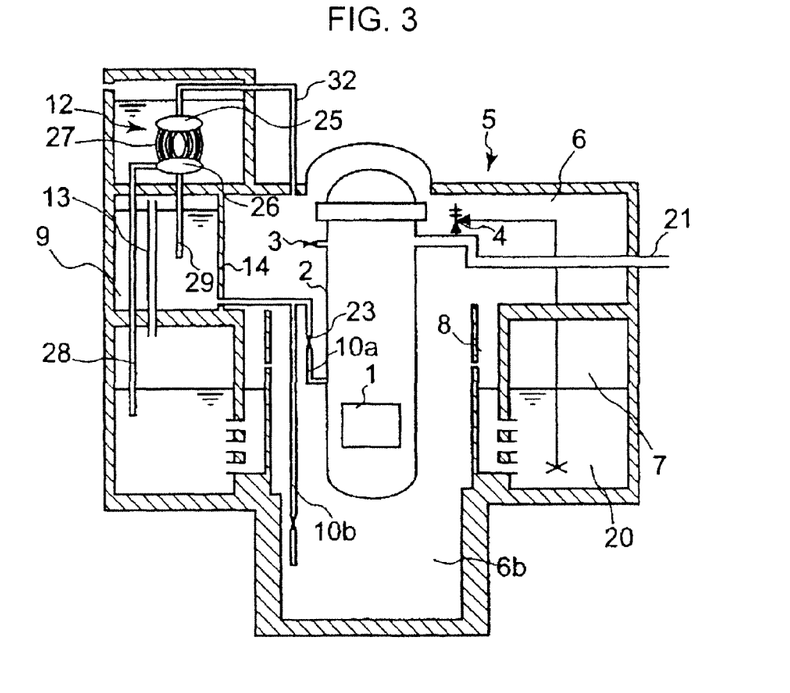
FIG. 3 is a schematic elevational cross-sectional view of the second embodiment of a boiling water nuclear reactor according to the present invention.

FIG. 3 is a schematic elevational cross-sectional view of the second embodiment of a boiling water nuclear reactor according to the present invention. In this embodiment, the gravity-driven water injection pool 9 holding boric acid aqueous solution is isolated from the dry well 6 by means of a partition wall 14. The gas phase section above the liquid surface of the gravity-driven water injection pool 9 is held in communication with the upper gas phase section in the wet well 7 by way of a first communication pipe 13.

The boric acid aqueous solution injection system including a boric acid aqueous solution injection tank 11 and a boric acid aqueous solution injection pipe 30 similar to its counterpart illustrated FIG. 1 are omitted in the embodiment shown in FIG. 3. However, the boric acid aqueous injection system may be arranged in this embodiment as in FIG. 1. This statement also applies to all the succeeding embodiments.

This embodiment operates like the first embodiment in the sense that it can maintain the core in a subcritical state by holding boric acid aqueous solution in gravity-driven water injection pool 9. Furthermore, in this embodiment, after the boric acid aqueous solution in the gravity-driven water injection pool 9 is discharged, the gas phase section of the gravity-driven water injection pool 9 operates as part of the gas phase section of the wet well 7. When a severe accident that involves damage to the core occurs in a boiling water nuclear reactor, the hydrogen that is generated as a result of the damage to the core is apt to be accumulated in the wet well 7, so that the rise of the internal pressure of the containment vessel 5 can be effectively suppressed by increasing the volume of the gas phase section of the wet well 7. Therefore, this embodiment can effectively suppress the rise of the internal pressure of the containment vessel when hydrogen is generated.

Third Embodiment

Figure 4:
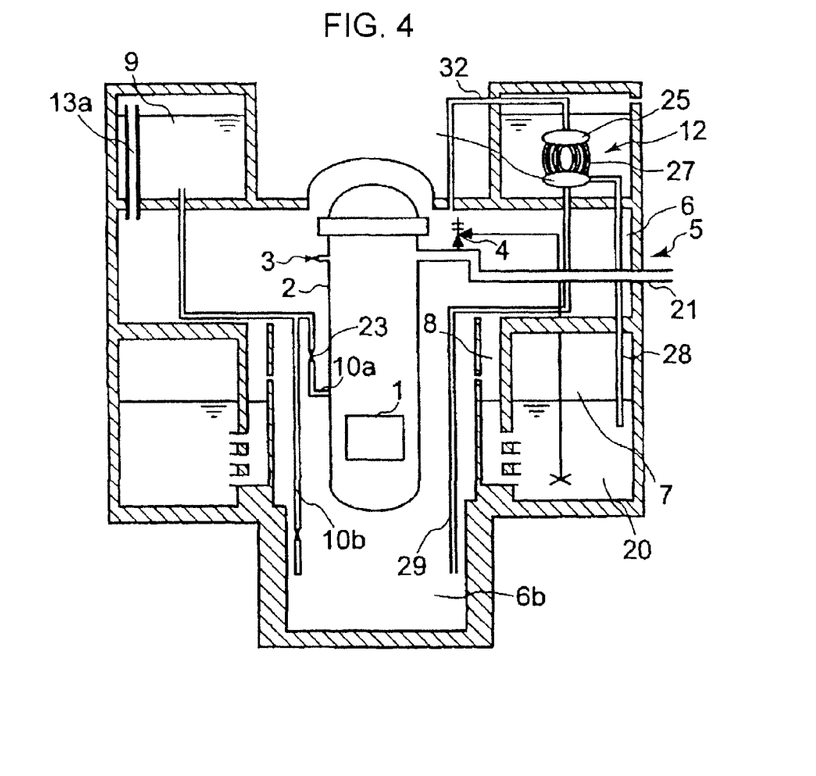
FIG. 4 is a schematic elevational cross-sectional view of the third embodiment of a boiling water nuclear reactor according to the present invention.

FIG. 4 is a schematic elevational cross-sectional view of the third embodiment of a boiling water nuclear reactor according to the present invention. In this embodiment, the gravity-driven water injection pool 9 holding boric acid aqueous solution is arranged above the ceiling of the reactor containment vessel 5. The gas phase section above the liquid surface of the gravity-driven water injection pool 9 is held in communication with an upper part of the dry well 6 by way of a second communication pipe 13a. Additionally, the drain pipe 29 connected to the bottom of the lower header 26 of the static containment vessel cooling system heat exchanger 12 extends down into the dry well lower region 6b in this embodiment.

This embodiment operates like the first embodiment in the sense that it can maintain the core in a subcritical state by holding boric acid aqueous solution in gravity-driven water injection pool 9. Additionally, the design limitations of the inside of the reactor containment vessel 5 are alleviated so that the reactor containment vessel 5 can be made compact particularly in terms of diameter.

Fourth Embodiment

Figure 5:
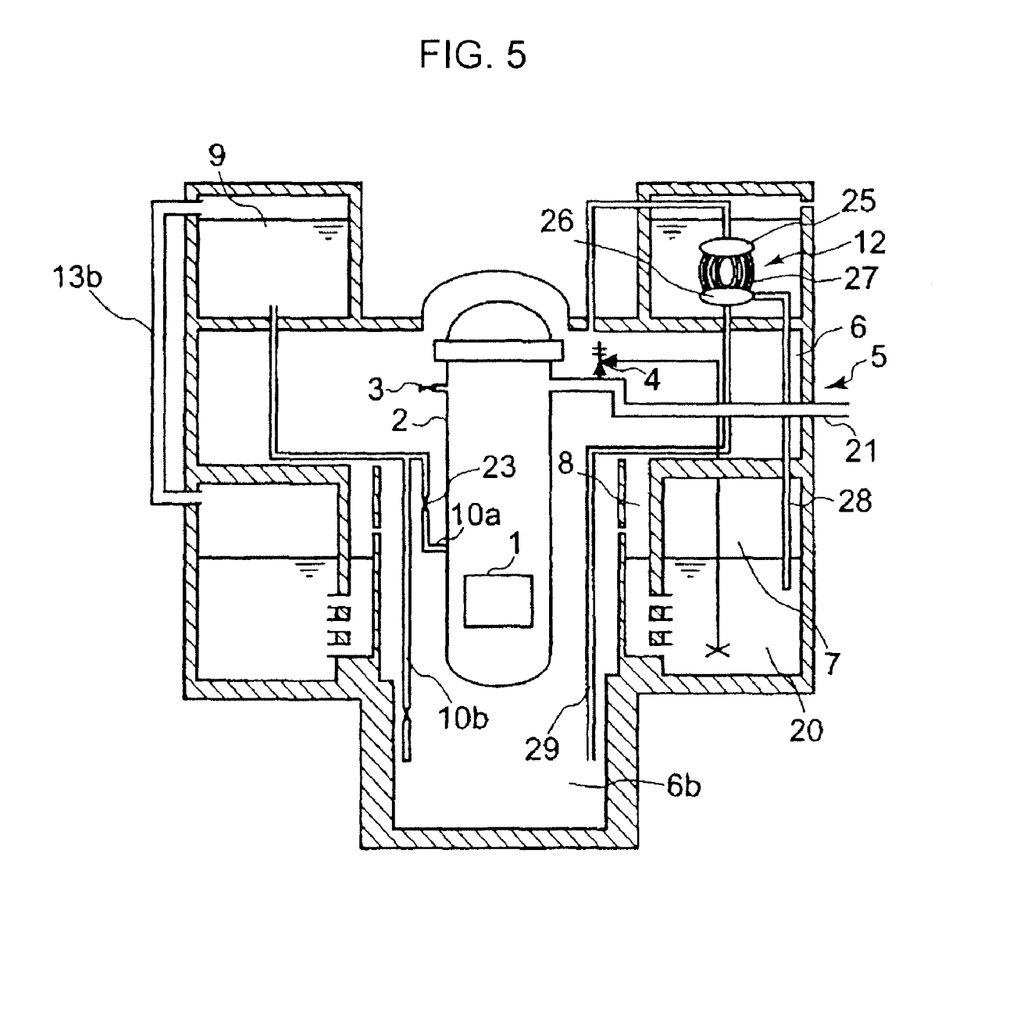
FIG. 5 is a schematic elevational cross-sectional view of the fourth embodiment of a boiling water nuclear reactor according to the present invention.

FIG. 5 is a schematic elevational cross-sectional view of the fourth embodiment of a boiling water nuclear reactor according to the present invention. As in the case of the third embodiment (FIG. 4), the gravity-driven water injection pool 9 holding boric acid aqueous solution is arranged above the ceiling of the reactor containment vessel 5 in this embodiment. Then, the gas phase section above the liquid surface of the gravity-driven water injection pool 9 and the gas phase section above the pressure suppression pool 20 in the wet well 7 are held in communication with each other by means of a third communication pipe 13b.

This embodiment provides advantages similar to those of the third embodiment. Additionally, this embodiment also provides advantages similar to those of the second embodiment because the gas phase section of the gravity-driven water injection pool 9 operates as part of the gas phase section of the wet well 7 after the boric acid aqueous solution in the gravity-driven water injection pool 9 is discharged.

Fifth Embodiment

Figure 6:
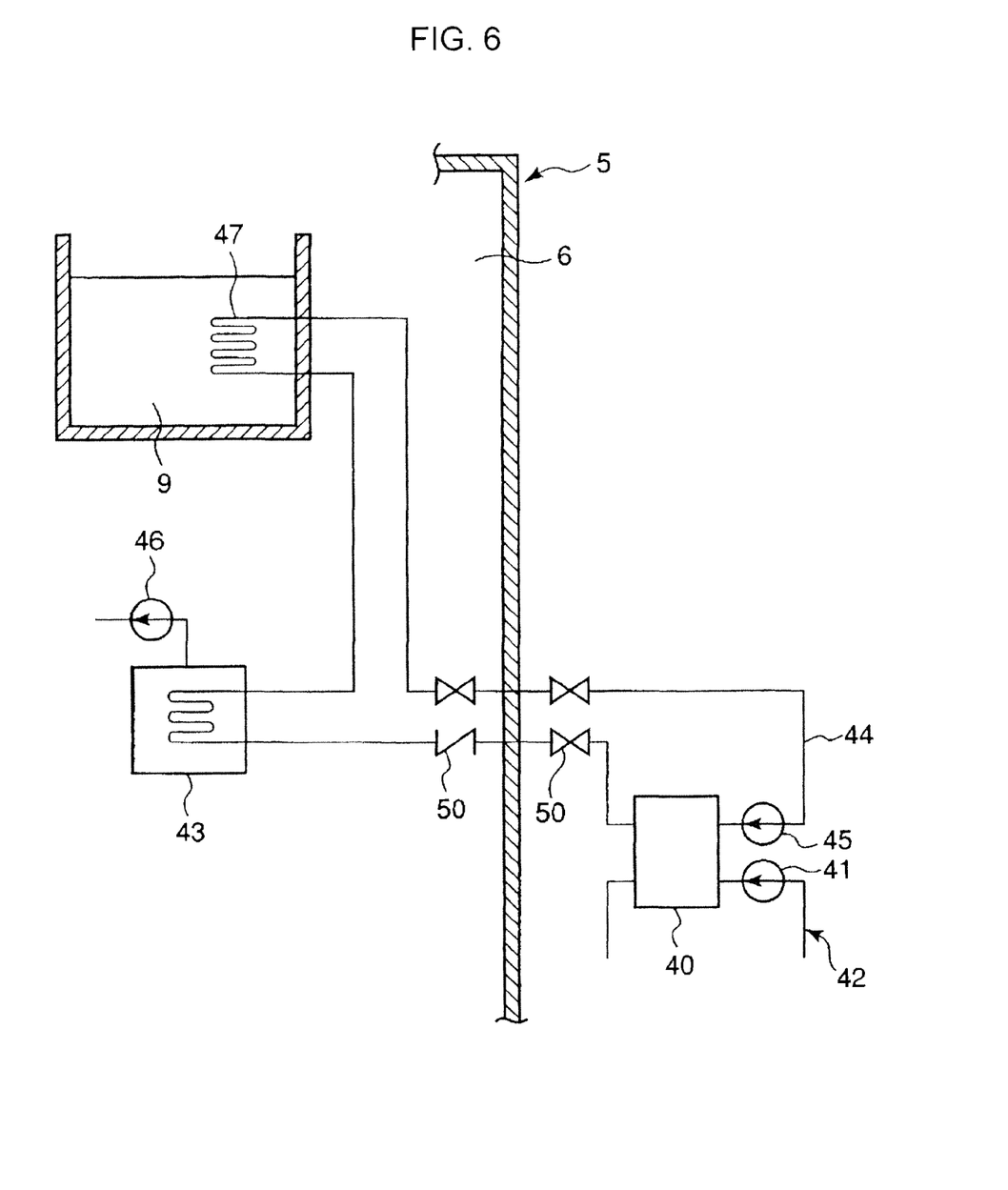
FIG. 6 is a schematic elevational cross-sectional view of the fifth embodiment of a boiling water nuclear reactor according to the present invention.

Now, the fifth embodiment of a boiling water nuclear reactor according to the present invention will be described below by referring to FIGS. 1 and 6. FIG. 6 is a schematic elevational cross-sectional view of the fifth embodiment of a boiling water nuclear reactor according to the present invention. This embodiment is a modification of the first embodiment. This embodiment has the arrangement shown in FIG. 1 commonly with the first embodiment.

Like the first embodiment, the sixth embodiment is adapted to use boric acid aqueous solution as water held in the gravity-driven water injection pool 9. As the temperature of the gravity-driven water injection pool 9 decreases, boric acid becomes deposited. This embodiment utilizes waste heat of the dry well cooling system to suppress the deposition of boric acid in the gravity-driven water injection pool 9 and maintain the state of the boric acid dissolved in water. The dry well cooling system is same as the one arranged in conventional boiling water nuclear reactors in order to suppress the internal temperature of the dry well 6 below a predetermined level during normal operation of the nuclear reactor as shown in Japanese Patent Application Laid-Open Publication No. 2001-215191 (the entire content of which is incorporated herein by reference).

As shown in FIG. 6, an external heat exchanger 40 is arranged outside the reactor containment vessel. It is typically part of a sea water system 42 including a sea water pump 41. An intra dry well heat exchanger 43 is arranged in the dry well 6, while dry well cooling water pipes 44 and a dry well cooling water pump 45 are arranged to supply cooling water cooled by the external heat exchanger 40 to the intra dry well heat exchanger 43. A fan 46 is additionally arranged in order to forcibly circulate gas in the dry well 6 so that the inside of the dry well 6 is efficiently cooled by the intra dry well heat exchanger 43.

An intra injection pool heat exchanger 47 is arranged in the gravity-driven water injection pool 9 and the water warmed by the intra dry well heat exchanger 43 is supplied to the intra injection pool heat exchanger 47. The cooling water that is used to warm the boric acid aqueous solution in the gravity-driven water injection pool 9 by means of the intra injection pool heat exchanger 47 and whose temperature is lowered is fed to the external heat exchanger 40 by way of the dry well cooling water pipes 44 and the dry well cooling water pump 45. Thus, the cooling water is cooled further. Isolation valves 50 are fitted to the dry well cooling water pipes 44 at positions where the cooling water pipes 44 penetrate the reactor containment vessel 5.

This embodiment provides advantages similar to those of the first embodiment. Additionally, this embodiment can suppress the deposition of boric acid in the gravity-driven water injection pool 9 because it warms the boric acid aqueous solution in the gravity-driven water injection pool 9. Additionally, this embodiment is economically advantageous since waste heat from the existing dry well cooling system can be utilized.

Other Embodiments

While several embodiments are described above, they are only some of the conceivable embodiments of the present invention and the present invention is by no means limited thereto.

For example, the boric acid aqueous solution injection tank 11 and the boric acid aqueous solution injection pipe 30 of each of the above-described embodiments may be arranged in a manner as shown in FIG. 1 or omitted as shown in FIGS. 3 through 5. Additionally, the emergency dry well water-injection piping system 10b can be appropriately omitted.

The fifth embodiment is a modification of the first embodiment that is formed by adding the functional feature of warming the boric acid aqueous solution in the gravity-driven water injection pool 9, utilizing waste heat from the dry well cooling system. The same additional functional feature may be added to the second through fourth embodiments.

What is claimed is:

1. A boiling water nuclear reactor comprising:
   a core;
   a reactor pressure vessel containing the core;
   a reactor containment vessel including: a dry well containing the reactor pressure vessel, and a wet well containing a pressure suppression pool;
   a vent pipe connecting the dry well and the pressure suppression pool;
   a gravity-driven water injection pool arranged at a position higher than the core to hold boric acid aqueous solution therein;
   an emergency core water-injection piping system for causing the boric acid aqueous solution in the gravity-driven water injection pool to fall by gravity so as to be injected into the reactor pressure vessel in case of a reactor accident;
   a static containment vessel cooling system pool arranged outside the reactor containment vessel;
   a static containment vessel cooling system heat exchanger arranged in the static containment vessel cooling system pool;
   a dry well connection pipe connecting an upper part of the static containment vessel cooling system heat exchanger and the dry well;
   a gas vent pipe for discharging noncondensible gas in the static containment vessel cooling system heat exchanger into an inside of the pressure suppression pool;
   an intra dry well heat exchanger arranged in the dry well;
   an external heat exchanger arranged outside the reactor containment vessel;
   a dry well cooling water pipe connecting the intra dry well heat exchanger and the external heat exchanger in order to discharge heat obtained by the intra dry well heat exchanger at the external heat exchanger; and
   a boric acid aqueous solution heating device configured to heat the boric acid aqueous solution in the gravity-driven water injection pool by using part of the heat obtained by the intra dry well heat exchanger.

2. The reactor according to claim 1, wherein the gravity-driven water injection pool is arranged in the dry well.

3. The reactor according to claim 2, further comprising a drain pipe for discharging condensed water in the static containment vessel cooling system heat exchanger into the gravity-driven water injection pool.

4. The reactor according to claim 1, wherein:
   the gravity-driven water injection pool is arranged in the reactor containment vessel and partitioned from the dry well and the wet well; and
   the nuclear reactor further comprises a first communication pipe holding a gas phase section in an upper part of the gravity-driven water injection pool and a gas phase section above the pressure suppression pool in the wet well in communication with each other.

5. The reactor according to claim 4, further comprising a drain pipe for discharging condensed water in the static containment vessel cooling system heat exchanger into the gravity-driven water injection pool.

6. The reactor according to claim 1, wherein:
   the gravity-driven water injection pool is held gas-tight and arranged above the reactor containment vessel; and
   the nuclear reactor further comprises a second communication pipe holding a gas phase section above the gravity-driven water injection pool and the dry well in communication with each other.

7. The reactor according to claim 6, further comprising a drain pipe for discharging condensed water in the static containment vessel cooling system heat exchanger into a lower part of the dry well.

8. The reactor according to claim 1, wherein the gravity-driven water injection pool is held gas-tight and arranged above the reactor containment vessel; and
   the nuclear reactor further comprises a third communication pipe holding a gas phase section in an upper part of the gravity-driven water injection pool and a gas phase section above the pressure suppression pool in the wet well in communication with each other.

9. The reactor according to claim 8, further comprising a drain pipe for discharging condensed water in the static containment vessel cooling system heat exchanger into a lower part of the dry well.

10. The reactor according to claim 1, further comprising an emergency dry well water-injection piping system for injecting the boric acid aqueous solution in the gravity-driven water injection pool into a lower part of the dry well in case of a reactor accident.

11. The reactor according to claim 1, wherein the pressure suppression pool can be used to fill a fuel exchange pool with water when replacing fuel loaded in the core.

12. The reactor according to claim 1, further comprising: a boric acid aqueous solution injection system including a boric acid aqueous solution injection tank arranged outside the reactor containment vessel to store pressurized boric acid aqueous solution of a quantity less than a quantity of water in the gravity-driven water injection pool and adapted to inject boric acid aqueous solution into the core from the boric acid aqueous solution injection tank.

13. The reactor according to claim 1, further comprising: a pressure-reducing valve arranged at the reactor pressure vessel at a position above the core so as to be capable of discharging steam from an inside of the reactor pressure vessel into the dry well.

14. An emergency core cooling system of a boiling water nuclear reactor, the emergency core cooling system comprising:
   a gravity-driven water injection pool to hold boric acid aqueous solution therein, the gravity-driven water injection pool being arranged at a position higher than the core;
   an emergency core water-injection piping system for causing the boric acid aqueous solution in the gravity-driven water injection pool to fall by gravity so as to be injected into a reactor pressure vessel containing the core, in case of a reactor accident;
   a static containment vessel cooling system pool arranged outside a reactor containment vessel that contains the reactor pressure vessel at a position above a pressure suppression pool;
   a static containment vessel cooling system heat exchanger arranged in the static containment vessel cooling system pool;
   a dry well connection pipe connecting an upper part of the static containment vessel cooling system heat exchanger and a dry well that contains the reactor pressure vessel and that is part of the reactor containment vessel;
   a gas vent pipe for discharging noncondensible gas in the static containment vessel cooling system heat exchanger into an inside of the pressure suppression pool;
   an intra dry well heat exchanger arranged in the dry well;
   an external heat exchanger arranged outside the reactor containment vessel;
   a dry well cooling water pipe connecting the intra dry well heat exchanger and the external heat exchanger in order to discharge heat obtained by the intra dry well heat exchanger at the external heat exchanger; and
   a boric acid aqueous solution heating device configured to heat the boric acid aqueous solution in the gravity-driven water injection pool by using part of the heat obtained by the intra dry well heat exchanger.

* * * * *